Nov. 15, 1932. G. F. HICKMAN 1,887,640
DRILL
Filed June 11, 1930
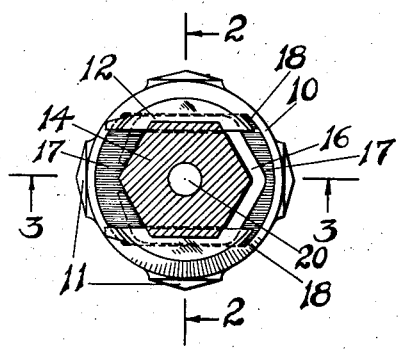
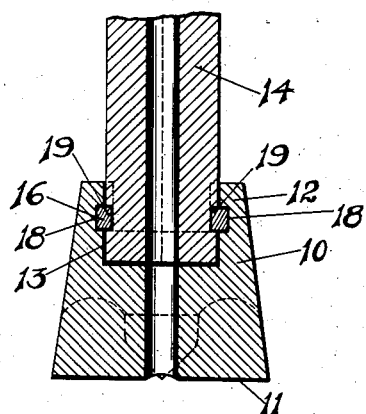
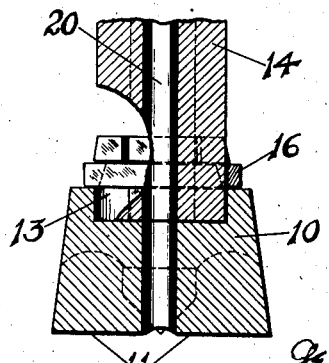

Patented Nov. 15, 1932

1,887,640

UNITED STATES PATENT OFFICE

GEORGE F. HICKMAN, OF NEWARK, NEW JERSEY, ASSIGNOR TO GOUVERNEUR G. BROWN

DRILL

Application filed June 11, 1930. Serial No. 460,344.

This invention relates to drills and more particularly to rock drills.

It is an object of the invention to produce a drill bit of simple, sturdy and efficient construction and to provide for firm attachment of the drill bit to the shank end in service and for convenient removal and replacement of drill bits on the shank end.

With these general objects in view, the invention consists in the features, combinations, details of construction and arrangements of parts which will be described first in connection with the accompanying drawing showing the invention in the form now preferred by me and then more specifically pointed out.

In the drawing:—

Figure 1 is a sectional plan view of a practical exemplification of the invention;

Figure 2 is a sectional, elevational view taken as on line 2—2 of Figure 1; and

Figure 3 is a sectional, elevational view taken as on line 3—3 of Figure 1.

A drill bit constructed in accordance with the invention comprises a body member having integral drilling teeth at one end and an integral hollow extension at the other end providing a socket for placement on the shank end and for producing a sleeve engagement of the drill bit on the shank end. The socket and shank are shaped to produce an interlocking, non-circular connection whereby the shank rotates the drill bit. Means are provided for attaching the bit securely to the shank end and for permitting convenient removal and replacement of bits on said end.

In the embodiment shown as an example, the rounded body member 10 has integrally formed teeth 11 at one end and an integral hollow extension 12 at the other end. The teeth may be of any known or suitable design and the extension provides a socket 13 for placement over the end of the shank 14. The socket and shank are shaped to produce an interlocking non-circular connection and to this end, as here shown, the socket may be multi-sided to fit a multi-sided shank. In the particular embodiment, the shank and socket are hexagonal. The socket is sufficiently deep to produce a substantial sleeve engagement of the drill bit on the shank end and, as here shown, the bottom of the socket is advantageously flat so as to engage evenly the shank end. The thrust of the shank is thus evenly applied to the bit.

Means are provided for securing the drill bit in position on the shank end. In accordance with the invention, the securing means are such as to permit convenient removal and replacement of drill bits on the shank end. In the particular embodiment shown, the drill bit is secured to the shank end in service by a keeper which passes laterally through the extension and shank. Although capable of various constructions, in that shown as an example, the keeper is a hairpin 16. Opposite sides of the extension have openings 17 and these openings are connected by side grooves 18 on the interior of the socket. The shank also has side grooves 19 which coincide with the side grooves of the socket when the drill bit is placed axially down and over the shank end. The hairpin is inserted laterally through one of the openings and, when in retaining position, the legs of the hairpin fit into the coinciding side grooves of the shank and socket and serve as locks, and with the bight portion of the hairpin in the opening through which it was inserted. The projecting free ends of the hairpin are bent over on the surface of the shank in order to retain the hairpin in place. In order to remove the hairpin, it is necessary only to bend back the ends and slide the hairpin out laterally whereupon the drill bit may be removed axially from the shank end.

The drill bit may be heat-treated in any known or suitable manner. The teeth of the bit should be as hard as possible while the rear extension should be tough. When of steel, the bit is advantageously heat-treated by quenching the teeth only when at a temperature above the hardening temperature (about 1400° F.), while the body and extension are allowed to cool to a lower temperature before quenching. This method of treatment gives the desired characteristics to the teeth and extension.

The drill bit and shank have the usual coinciding center bores 20 down which air is forced during the operation of the drill to blow away the pulverized rock and to keep clean the surface of the rock being drilled.

What is claimed is:

A drill bit comprising a body member having integral teeth at one end and an integral hollow extension at the other end forming a socket for fitting said bit on a shank end, said socket being sufficiently deep to have a substantial sleeve engagement on the shank, said socket and shank being shaped to provide an interlocking, non-rotary connection, said extension having oppositely disposed side openings and internal grooves in the socket walls between said openings, said grooves being adapted to coincide with grooves on the sides of the shank, and a hairpin having a bight portion and leg portions adapted to be inserted laterally through a side opening whereby the legs fit the coinciding grooves, the bight portion enters one opening and the free ends of the legs may be bent inwardly in the other openings against the shank surface.

In testimony whereof, I have hereunto set my hand.

GEORGE F. HICKMAN.